(12) United States Patent
Urabe

(10) Patent No.: US 12,253,084 B2
(45) Date of Patent: Mar. 18, 2025

(54) MOTOR-DRIVEN COMPRESSOR

(71) Applicant: KABUSHIKI KAISHA TOYOTA JIDOSHOKKI, Kariya (JP)

(72) Inventor: Shogo Urabe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/865,971

(22) Filed: Jul. 15, 2022

(65) Prior Publication Data
US 2023/0033477 A1   Feb. 2, 2023

(30) Foreign Application Priority Data

Jul. 27, 2021   (JP) ................................. 2021-122454

(51) Int. Cl.
*F04C 29/00* (2006.01)
*F04B 39/12* (2006.01)
*H02K 11/33* (2016.01)

(52) U.S. Cl.
CPC ........ *F04C 29/0085* (2013.01); *F04B 39/121* (2013.01); *H02K 11/33* (2016.01); *F04C 2240/30* (2013.01); *F04C 2240/40* (2013.01); *F04C 2240/803* (2013.01); *F04C 2240/808* (2013.01)

(58) Field of Classification Search
CPC .............. F04C 29/0085; F04C 2240/30; F04C 2240/40; F04C 2240/803; F04C 2240/808; F04C 23/008; F04C 18/0215; F04C 2210/26; F04C 23/02; F04B 39/121; H02K 11/33
See application file for complete search history.

(56) References Cited

U.S. PATENT DOCUMENTS

| | | | |
|---|---|---|---|
| 7,056,104 B2* | 6/2006 | Kimura .................. | H02K 5/225 310/85 |
| 10,658,901 B2* | 5/2020 | Kinoshita ............... | F04B 35/04 |
| 11,097,592 B2* | 8/2021 | Kagawa ............. | B60H 1/00428 |
| 11,204,024 B2* | 12/2021 | Kinoshita ............... | F04B 35/04 |
| 11,312,466 B1* | 4/2022 | Slocum .................... | B64B 1/40 |

(Continued)

FOREIGN PATENT DOCUMENTS

| | | |
|---|---|---|
| JP | 2016-217291 A | 12/2016 |
| JP | 2020-159320 A | 10/2020 |

*Primary Examiner* — Charles G Freay
*Assistant Examiner* — Lilya Pekarskaya
(74) *Attorney, Agent, or Firm* — Sughrue Mion, PLLC

(57) ABSTRACT

A motor-driven compressor includes an inverter that includes a circuit board and an electrical component, and an inverter cover that defines an inverter accommodating chamber together with an end wall of a motor housing member. The inverter accommodating chamber accommodates a first conductive member and a second conductive member. A first end of the first conductive member and a lead of the electrical component extend through the circuit board from a first surface, which faces the end wall, and are soldered to the circuit board on a second surface on a side opposite to the first surface. A first end of the second conductive member is electrically connected to a power supply connector. Second ends of the first conductive member and the second conductive member are mated to each other so as to be electrically connected to each other when the inverter cover is joined to the motor housing member.

6 Claims, 3 Drawing Sheets

(56) References Cited

U.S. PATENT DOCUMENTS

2015/0357886 A1* 12/2015 Ishizeki ................ F04C 11/008
                                                                310/71
2019/0305467 A1* 10/2019 Kinoshita .......... H01R 13/6582
2020/0313504 A1* 10/2020 Okochi ............... F04C 29/0085
2021/0305871 A1*  9/2021 Yamakage .............. F04B 39/00

* cited by examiner

MOTOR-DRIVEN COMPRESSOR

BACKGROUND

1. Field

The present disclosure relates to a motor-driven compressor.

2. Description of Related Art

A motor-driven compressor includes a compression unit, an electric motor, and an inverter. The compression unit compresses a fluid. The electric motor drives the compression unit. The inverter drives the electric motor. The inverter includes a circuit board and electrical components mounted on the circuit board. The motor-driven compressor includes a motor housing member, which includes a tubular peripheral wall and an end wall closing one end of the peripheral wall. The motor housing member accommodates the electric motor. The motor-driven compressor includes an inverter cover. The inverter cover is joined to the end wall of the motor housing member so as to define an inverter accommodating chamber, which accommodates the inverter. The motor-driven compressor includes an external connector. The external connector is fixed to the inverter cover. A power supply connector is connected to the external connector from outside. Power is supplied to the circuit board of the inverter from the power supply connector, which is connected to the external connector, so that the inverter drives the electric motor. For example, Japanese Laid-Open Patent Publication No. 2020-159320 discloses a configuration in which an external connector protrudes from an inverter cover.

In many motor-driven compressors, electrical components are thermally coupled to an end wall so as to be cooled. Accordingly, the electrical components are arranged between the circuit board and the end wall. The circuit board includes a first surface, which faces the end wall, and a second surface, which is on a side opposite to the first surface. Leads of the electrical components extend through the circuit board to be soldered to the second surface. If an external connector protrudes from an inverter cover as in the above-described publication, conductive members that electrically connect the circuit board to the power supply connector cannot be easily soldered to the second surface of the circuit board. This necessitates a process that solders the conductive members to the first surface of the circuit board, which reduces productivity. Accordingly, there is demand for a technique that improves productivity of motor-driven compressors while facilitating formation of conductive paths from a power supply connector to a circuit board.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect of the present disclosure, a motor-driven compressor includes a compression unit configured to compress a fluid, an electric motor configured to drive the compression unit, an inverter configured to drive the electric motor, a motor housing, an inverter cover, and an external connector. The motor housing member includes a peripheral wall and an end wall closing one end of the peripheral wall. The motor housing member accommodates the electric motor. The inverter cover is joined to the end wall so as to define an inverter accommodating chamber. The inverter accommodating chamber accommodates the inverter. The external connector is fixed to the inverter cover and is configured to be connected to a power supply connector from outside. The inverter includes a circuit board and an electrical component mounted on the circuit board. The electrical component is thermally coupled to the end wall. The inverter accommodating chamber incorporates a first internal connector and a second internal connector. The first internal connector includes a first case that is made of a plastic and is fixed to the end wall, and a first conductive member that is incorporated in the first case. The second internal connector includes a second case that is made of a plastic and is fixed to the inverter cover, and a second conductive member that is incorporated in the second case. The circuit board includes a first surface that faces the end wall, and a second surface that is on a side opposite to the first surface. A first end of the first conductive member and a lead of the electrical component extend through the circuit board from the first surface and are soldered to the circuit board on the second surface. A first end of the second conductive member is configured to be electrically connected to the power supply connector. A second end of the first conductive member and a second end of the second conductive member are configured such that, when the inverter cover is joined to the motor housing member, the second end of the first conductive member and the second end of the second conductive member are mated to each other so as to be electrically connected to each other. The second end of the first conductive member and the second end of the second conductive member are also configured such that, when the inverter cover is separated from the motor housing member, the second end of the first conductive member and the second end of the second conductive member are unmated from each other so as to be electrically disconnected from each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to one embodiment will now be described with reference to FIGS. 1 and 2. The motor-driven compressor 10 of the present embodiment is used, for example, in a vehicle air conditioner 22.

Overall Configuration of Motor-Driven Compressor 10

Figure 1:
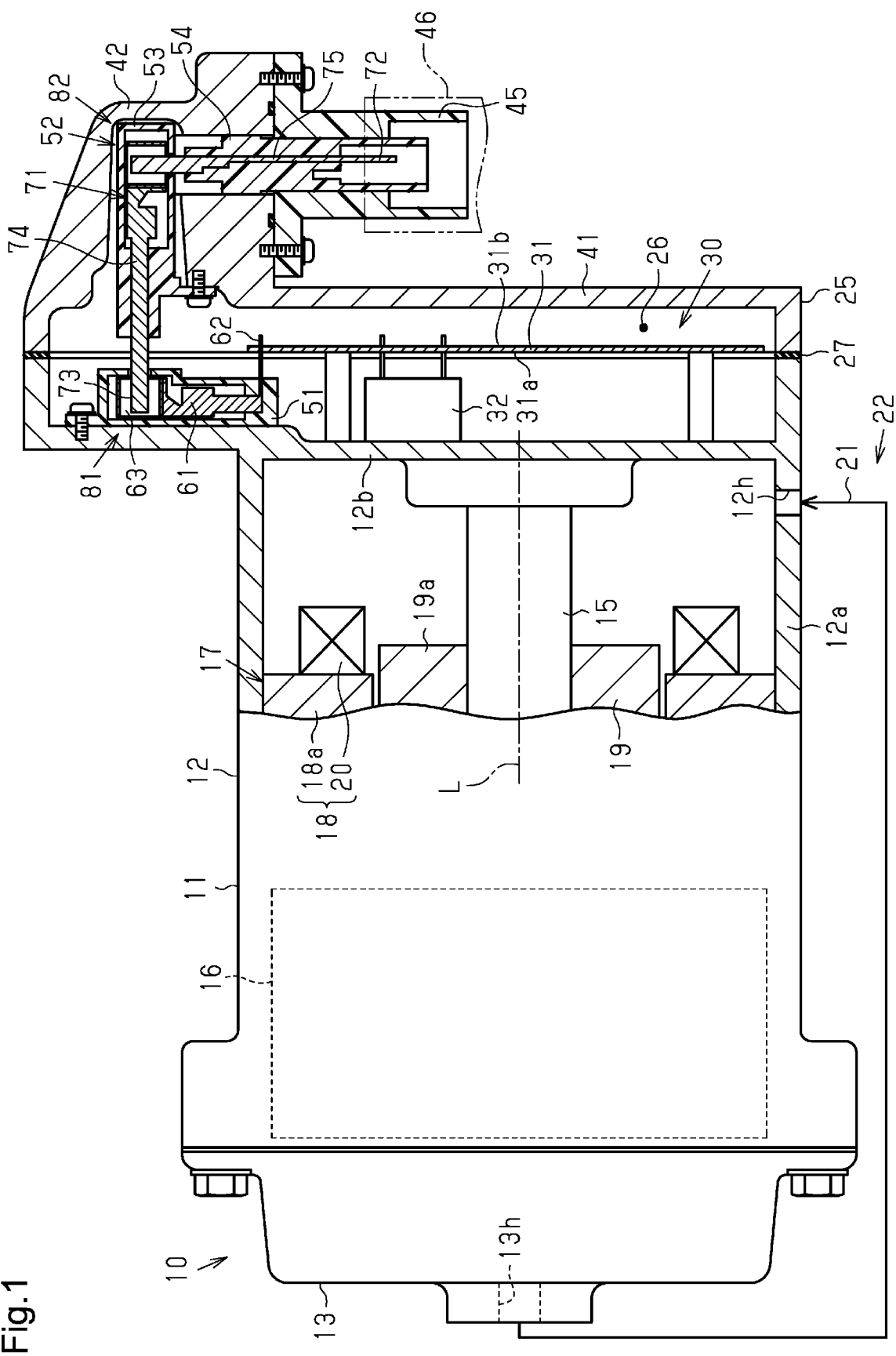
FIG. 1 is a partially cut away cross-sectional side view showing a motor-driven compressor according to an embodiment.

As shown in FIG. 1, the motor-driven compressor 10 includes a housing 11. The housing 11 includes a motor housing member 12 and a discharge housing member 13. The motor housing member 12 and the discharge housing member 13 are made of a metal such as aluminum.

The motor housing member 12 includes a tubular peripheral wall 12a and a plate-shaped end wall 12b, which closes an end of the peripheral wall 12a. Part of the end wall 12b extends radially outward beyond the outer edge of the opening of the peripheral wall 12a. The discharge housing member 13 is coupled to an open end of the peripheral wall 12a. The discharge housing member 13 closes an opening of the motor housing member 12 on a side opposite to the end wall 12b.

The motor-driven compressor 10 includes a rotary shaft 15. The rotary shaft 15 is accommodated in the motor housing member 12. The rotary shaft 15 is rotatably supported by the motor housing member 12. The motor-driven compressor 10 includes a compression unit 16. The compression unit 16 is driven by rotation of the rotary shaft 15 to compress a refrigerant, which is a fluid. The compression unit 16 is, for example, of a scroll type that includes a fixed scroll (not shown) fixed to the motor housing member 12 and a movable scroll (not shown) opposed to the fixed scroll.

The motor-driven compressor 10 includes an electric motor 17. The electric motor 17 is accommodated in the motor housing member 12. The housing 11 thus accommodates the compression unit 16 and the electric motor 17. The electric motor 17 rotates the rotary shaft 15 so as to drive the compression unit 16.

The electric motor 17 includes a tubular stator 18 and a rotor 19, which is arranged on the inner side of the stator 18. The rotor 19 rotates integrally with the rotary shaft 15. The stator 18 surrounds the rotor 19. The rotor 19 includes a rotor core 19a, which is fixed to the rotary shaft 15, and permanent magnets (not shown), which are provided on the rotor core 19a. The stator 18 includes a tubular stator core 18a and a motor coil 20, which is wound about the stator core 18a. When power is supplied to the motor coil 20, the rotor 19 and the rotary shaft 15 rotate.

The peripheral wall 12a of the motor housing member 12 has a suction port 12h. The discharge housing member 13 has a discharge port 13h. The suction port 12h is connected to an end of an external refrigerant circuit 21. The discharge port 13h is connected to another end of the external refrigerant circuit 21. Refrigerant from the external refrigerant circuit 21 is drawn into the motor housing member 12 through the suction port 12h. The refrigerant that has been drawn into the motor housing member 12 is compressed by the compression unit 16. The refrigerant that has been compressed by the compression unit 16 is delivered to the discharge housing member 13. The refrigerant delivered to the discharge housing member 13 is discharged to the external refrigerant circuit 21 through the discharge port 13h. The refrigerant that has been discharged to the external refrigerant circuit 21 flows through a heat exchanger and an expansion valve of the external refrigerant circuit 21 and then returns to the motor housing member 12 through the suction port 12h. The motor-driven compressor 10 and the external refrigerant circuit 21 form the vehicle air conditioner 22.

The motor-driven compressor 10 includes an inverter cover 25. The inverter cover 25 is made of a metal such as aluminum. The inverter cover 25 is coupled to the end wall 12b of the motor housing member 12. The inverter cover 25 is joined to the end wall 12b so as to define an inverter accommodating chamber 26. The inverter cover 25 thus defines the inverter accommodating chamber 26 together with the housing 11.

A seal member 27 is provided between the end wall 12b of the motor housing member 12 and the inverter cover 25. The seal member 27 provides a seal between the end wall 12b of the motor housing member 12 and the inverter cover 25.

Inverter 30

The motor-driven compressor 10 includes an inverter 30. The inverter 30 drives the electric motor 17. The inverter 30 is accommodated in the inverter accommodating chamber 26. The inverter accommodating chamber 26 thus accommodates the inverter 30. The compression unit 16, the electric motor 17, and the inverter 30 are arranged in that order in an axial direction in which an axis L of the rotary shaft 15 extends. The inverter 30 includes a circuit board 31. The circuit board 31 is accommodated in the inverter accommodating chamber 26 with the thickness direction of the circuit board 31 agreeing with the axial direction of the rotary shaft 15. Accordingly, the direction in which the circuit board 31 extends agrees with a direction orthogonal to the axial direction of the rotary shaft 15. The circuit board 31 includes a first surface 31a, which faces the end wall 12b, and a second surface 31b, which is on a side opposite to the first surface 31a.

Figure 2:
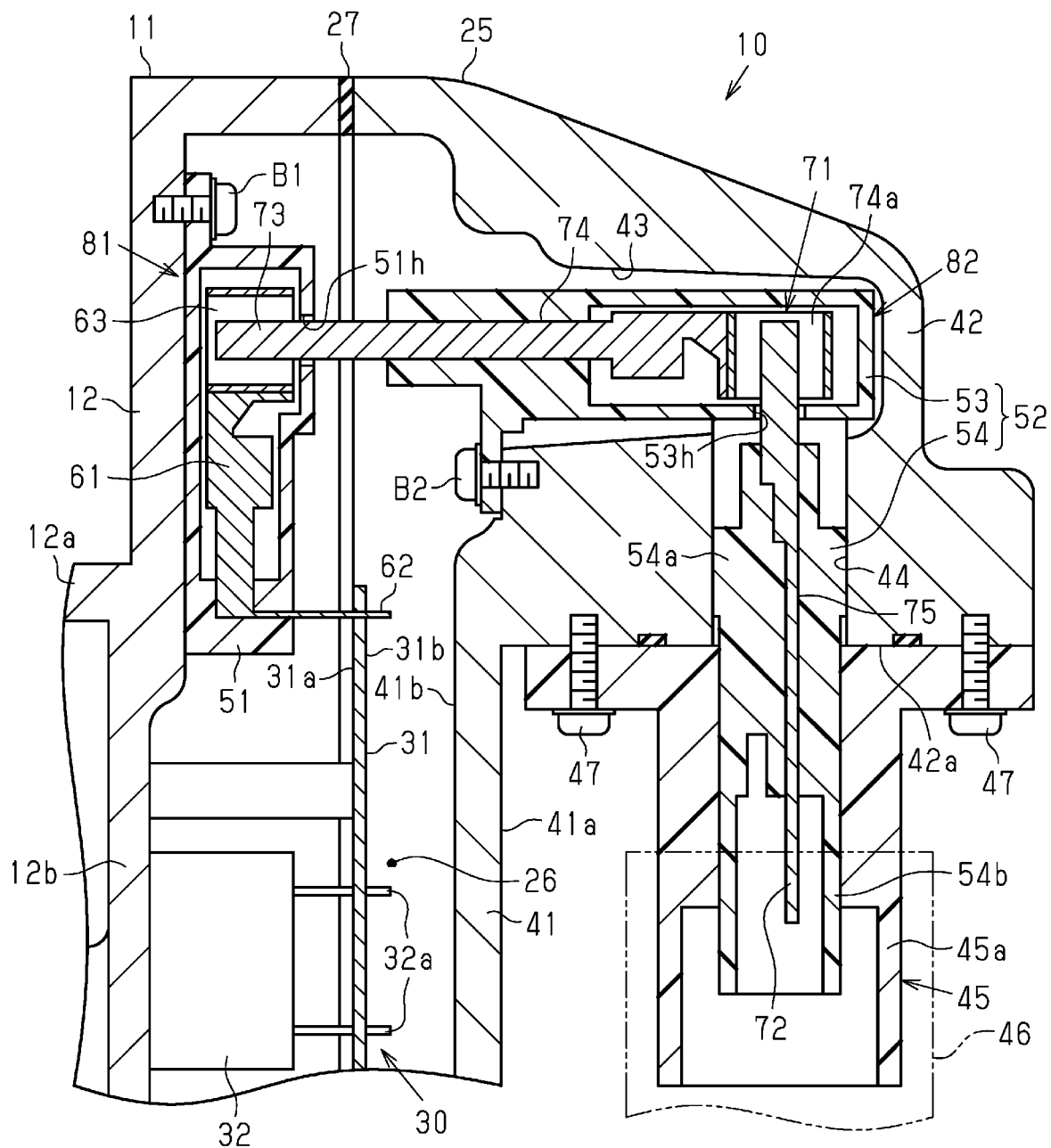
FIG. 2 is an enlarged cross-sectional view showing part of the motor-driven compressor of FIG. 1.

As shown in FIG. 2, at least one electrical component 32 is mounted on the circuit board 31. The inverter 30 thus includes the circuit board 31 and the electrical component 32 mounted on the circuit board 31. The electrical component 32 may be, for example, a capacitor that is a filter element for reducing noise, or a coil that forms a filter circuit together with a capacitor. The electrical component 32 is arranged between the circuit board 31 and the end wall 12b of the motor housing member 12, and is thermally coupled to the end wall 12b. The electrical component 32 includes component leads 32a, which are leads. The component leads 32a extend through the circuit board 31 from the first surface 31a to the second surface 31b, and are soldered to the second surface 31b. The component leads 32a thus extend through the circuit board 31 from the side of the circuit board 31 on which the electric motor 17 is located, and are soldered to the circuit board 31.

Configuration of Inverter Cover 25

The inverter cover 25 includes an extending wall 41 and a protruding wall 42. The extending wall 41 has the shape of a plate. The extending wall 41 extends along the circuit board 31. The extending wall 41 extends in a direction orthogonal to the thickness direction of the circuit board 31. The extending wall 41 is located on a side of the circuit board 31 that is opposite to the end wall 12b of the motor housing member 12.

The protruding wall 42 protrudes from an outer surface 41a of the extending wall 41. The protruding wall 42 is located on a side opposite to the circuit board 31 and protrudes from the extending wall 41 in a direction away from the circuit board 31. The direction in which the protruding wall 42 protrudes from the extending wall 41 agrees with the thickness direction of the circuit board 31. The protruding wall 42 is located near the outer edge of the outer surface 41a of the extending wall 41.

The protruding wall 42 includes a mounting surface 42a, which is continuous with the outer surface 41a of the extending wall 41. The mounting surface 42a extends in the protruding direction of the protruding wall 42 from the outer surface 41a of the extending wall 41. The mounting surface 42a thus extends in the thickness direction of the circuit board 31.

The inverter cover 25 includes a first accommodating hole 43. The first accommodating hole 43 extends through the extending wall 41 and is recessed in the protruding wall 42. A first end of the first accommodating hole 43 opens in the inner surface 41b of the extending wall 41. A second end of the first accommodating hole 43 is closed inside the protruding wall 42. The first accommodating hole 43 extends inside the protruding wall 42 in the protruding direction of the protruding wall 42. The first accommodating hole 43 opens in a section of the inner surface 41b of the extending wall 41 that does not overlap with the circuit board 31 when viewed in the axial direction of the rotary shaft 15.

The inverter cover 25 includes a second accommodating hole 44. The second accommodating hole 44 is formed in the protruding wall 42. A first end of the second accommodating hole 44 opens in the mounting surface 42a of the protruding wall 42. A second end of the second accommodating hole 44 is connected to the second end of the first accommodating hole 43. The second accommodating hole 44 extends inside the protruding wall 42 and along the extending wall 41. The second accommodating hole 44 thus extends along the circuit board 31.

Configuration of External Connector 45

The motor-driven compressor 10 includes a tubular external connector 45. The external connector 45 includes metal terminals and a tubular body 45a, which is made of a plastic and surrounds the metal terminals. A power supply connector 46 is connected to the external connector 45. The external connector 45 protrudes from the inverter cover 25. The external connector 45 is fixed to the protruding wall 42. Specifically, the tubular body 45a is mounted to the mounting surface 42a of the protruding wall 42 with screws 47. The tubular body 45a is mounted to the mounting surface 42a of the protruding wall 42 with an axis of the tubular body 45a agreeing with an axis of the second accommodating hole 44. The external connector 45 thus extends from the protruding wall 42 and along the extending wall 41. The external connector 45 is thus located on the side of the circuit board 31 that is opposite to the end wall 12b of the motor housing member 12, and extends along the circuit board 31. Accordingly, in the axial direction of the rotary shaft 15, the inverter 30 is located between the end wall 12b and the external connector 45. The extending direction of the external connector 45 is a direction orthogonal to the thickness direction of the circuit board 31.

Configuration of First Case 51

The motor-driven compressor 10 includes a first case 51, which is made of a plastic. The first case 51 is a case member that has the shape of a rectangular box. The first case 51 is fixed to the end wall 12b of the motor housing member 12 with a screw B1. The first case 51 is thus fixed to the housing 11. The first case 51 includes a first surface, which faces the end wall 12b, and a second surface is on a side opposite to the first surface. The first case 51 includes a first insertion hole 51h. The first insertion hole 51h opens in the second surface of the first case 51. A first surface of the first case 51 faces the electric motor 17.

The first case 51 is accommodated in the inverter accommodating chamber 26 in a state in which most of the first case 51 does not overlap with the circuit board 31 when viewed in the axial direction of the rotary shaft 15. In other words, the first case 51 is accommodated in the inverter accommodating chamber 26 in a state in which part of the first case 51 overlaps with the circuit board 31 when viewed in the axial direction of the rotary shaft 15. The first insertion hole 51h opens in a section of the second surface of the first case 51 that does not overlap with the circuit board 31 when viewed in the axial direction of the rotary shaft 15.

Configuration of First Conductive Member 61

The motor-driven compressor 10 includes a first conductive member 61. The first conductive member 61 is incorporated in the first case 51. A first end of the first conductive member 61 includes a connector lead 62. The connector lead 62 has the shape of a pillar. The connector lead 62 protrudes from the first case 51. The connector lead 62 extends through the circuit board 31 from the first surface 31a and is soldered to the second surface 31b of the circuit board 31, like the component leads 32a of the electrical component 32. The connector lead 62 protrudes from the second surface of the first case 51. The connector lead 62 protrudes from a section of the first case 51 that overlaps with the circuit board 31 when viewed in the axial direction of the rotary shaft 15.

A second end of the first conductive member 61 includes a first connecting portion 63. The first connecting portion 63 is tubular. The first connecting portion 63 is located inside the first case 51. The first conductive member 61 is incorporated in the first case 51 such that the inside of the first connecting portion 63 is exposed to the outside of the first case 51 through the first insertion hole 51h. The inside of the first connecting portion 63 is thus continuous with the first insertion hole 51h. The first case 51 and the first conductive member 61 form a first internal connector 81.

Configuration of Second Case 52

The motor-driven compressor 10 includes a second case 52, which is made of a plastic. The second case 52 includes a first holding portion 53 and a second holding portion 54. The first holding portion 53 is a case member that has the shape of a rectangular box. The first holding portion 53 is arranged in the inverter cover 25 such that most of the first holding portion 53 is located inside the first accommodating hole 43. Most of the first holding portion 53 is thus provided inside the protruding wall 42. The first holding portion 53 is fixed to the inverter cover 25 with a screw B2. The first holding portion 53 has a second insertion hole 53h. The second insertion hole 53h opens in a surface of the first holding portion 53 that faces the second accommodating hole 44. The first holding portion 53 is arranged in the first accommodating hole 43 such that the second insertion hole 53h is connected to the second accommodating hole 44.

The second holding portion 54 is, for example, a block having the shape of a pillar. The second holding portion 54 includes a fitting portion 54a and a tubular portion 54b. The fitting portion 54a is fitted into the second accommodating hole 44. The fitting portion 54a is thus provided inside the protruding wall 42. Therefore, part of the second case 52 is provided in the protruding wall 42. The second holding portion 54 is fixed to the inverter cover 25 by fitting the fitting portion 54a into the second accommodating hole 44.

The second case 52 is thus fixed to the inverter cover 25. The second holding portion 54 is arranged in the second accommodating hole 44 such that the tubular portion 54b protrudes from the second accommodating hole 44 beyond the mounting surface 42a. The tubular portion 54b of the second holding portion 54 protrudes into the external connector 45.

Configuration of Second Conductive Member 71

The motor-driven compressor 10 includes a second conductive member 71. The second conductive member 71 is incorporated in the second case 52. A first end of the second conductive member 71 includes a connector connecting portion 72. The connector connecting portion 72 is located inside the tubular body 45a and is exposed to the outside, so as to form a metal terminal of the external connector 45. The connector connecting portion 72 is thus electrically connected to the power supply connector 46. A second end of the second conductive member 71 includes a second connecting portion 73. The second connecting portion 73 is electrically connected to the first connecting portion 63 of the first conductive member 61. Therefore, the second end of the first conductive member 61 and the second end of the second conductive member 71 respectively include the first connecting portion 63 and the second connecting portion 73, which are electrically connected to each other.

The second conductive member 71 includes a first extending portion 74 and a second extending portion 75. The first extending portion 74 is held by the first holding portion 53. The first holding portion 53 thus holds the first extending portion 74. A first end of the first extending portion 74 includes a first extending terminal 74a. The first extending terminal 74a is tubular. The first extending terminal 74a is located inside the first holding portion 53. The first extending portion 74 is incorporated in the first holding portion 53 in a state in which the inside of the first extending terminal 74a is exposed to the outside of the first holding portion 53 through the second insertion hole 53h. The inside of the first extending terminal 74a is thus continuous with the second insertion hole 53h.

A second end of the first extending portion 74 has the shape of a pillar that protrudes from the first holding portion 53. The second end of the first extending portion 74 is inserted into the first case 51 through the first insertion hole 51h, so as to be fitted into the first connecting portion 63 of the first conductive member 61. The first extending portion 74 and the first conductive member 61 are electrically connected to each other. The second end of the first extending portion 74 is the second connecting portion 73, which is electrically connected to the first connecting portion 63. The second end of the first extending portion 74 is thus the second end of the second conductive member 71. The first extending portion 74 therefore includes an end that extends in the protruding direction of the protruding wall 42 and is mated with the second end of the first conductive member 61.

The first connecting portion 63 of the first conductive member 61 and the second connecting portion 73 of the second conductive member 71 are mated to each other to be electrically connected to each other when the inverter cover 25 is joined to the motor housing member 12. On the other hand, the first connecting portion 63 of the first conductive member 61 and the second connecting portion 73 of the second conductive member 71 are unmated from each other to be electrically disconnected from each other when the motor housing member 12 and the inverter cover 25 are separated from each other.

The second extending portion 75 is held by the second holding portion 54. The second holding portion 54 thus holds the second extending portion 75. A first end of the second extending portion 75 has the shape of a thin plate and extends through the second holding portion 54 so as to protrude into the tubular portion 54b of the second holding portion 54. The first end of the second extending portion 75 is the connector connecting portion 72, which can be electrically connected to the power supply connector 46. The first end of the second extending portion 75 is thus a first end of the second conductive member 71 and is electrically connected to the power supply connector 46. The second extending portion 75 includes an end that extends in the extending direction of the extending wall 41 and is exposed in the external connector 45.

A second end of the second extending portion 75 has the shape of a pillar and protrudes from the second holding portion 54. The second end of the second extending portion 75 is inserted into the first holding portion 53 through the second insertion hole 53h and is fitted into the first extending terminal 74a of the first extending portion 74. Accordingly, the first extending portion 74 and the second extending portion 75 are electrically connected to each other. The second case 52 and the second conductive member 71 form a second internal connector 82. The inverter accommodating chamber 26 incorporates the first internal connector 81 and the second internal connector 82.

Operation

Operation of the present embodiment will now be described.

The first end of the first conductive member 61 includes the connector lead 62, which is soldered to the circuit board 31. The connector lead 62 protrudes form the first case 51, extends through the circuit board 31 from the first surface 31a, and is soldered to the second surface 31b of the circuit board 31. Like the connector lead 62, the component leads 32a extend through the circuit board 31 from the first surface 31a, and are soldered to the second surface 31b of the circuit board 31. When the end wall 12b and the inverter cover 25 are joined to each other, the first connecting portion 63 of the first conductive member 61 and the second connecting portion 73 of the second conductive member 71 are connected to each other. Accordingly, the first conductive member 61 and the second conductive member 71 are electrically connected to each other. Power from the power supply connector 46 is supplied to the circuit board 31 via the connector connecting portion 72 of the second conductive member 71, the second connecting portion 73 of the second conductive member 71, the first connecting portion 63 of the first conductive member 61, and the connector lead 62 of the first conductive member 61. Accordingly, the inverter 30 drives the electric motor 17.

Advantages

The above-described embodiment has the following advantages.

(1) The first end of the first conductive member 61 extends through the circuit board 31 from the first surface 31a to the second surface 31b, and is soldered to the circuit board 31 on the second surface 31b. Thus, the first end of the first conductive member 61 and the component leads 32a of the electrical component 32 can be soldered to the second surface 31b in the same process. Further, the first end of the second conductive member 71 is electrically connected to the power supply connector 46. Also, the second end of the first conductive member 61 and the second end of the second conductive member 71 are mated to each other to be electrically connected to each other when the inverter cover 25 is joined to the motor housing member 12. The first conductive member 61 and the second conductive member 71 thus can be electrically connected to each other simply by joining the inverter cover 25 to the motor housing member 12. Power from the power supply connector 46 is supplied to the circuit board 31 via the connector connecting portion 72 of the second conductive member 71, the second connecting portion 73 of the second conductive member 71, the first connecting portion 63 of the first conductive member 61, and the connector lead 62 of the first conductive member 61. Accordingly, the inverter 30 drives the electric motor 17. Even in this configuration, in which the external connector 45 protrudes from the inverter cover 25 with the electrical component 32 being thermally coupled to the end wall 12b, a conductive member that electrically connects the power supply connector 46 to the circuit board 31 does not need to be soldered to the first surface 31a of the circuit board 31. Further, a conductive path is easily established from the power supply connector 46 to the circuit board 31. The productivity of the motor-driven compressor 10 is thus improved.

(2) The external connector 45 extends from the protruding wall 42 and along the extending wall 41, and part of the second case 52 is provided inside the protruding wall 42. Thus, even though the inverter cover 25 is made of a metal, and the external connector 45 extends along the extending wall 41, it is possible to facilitate the manufacture of the motor-driven compressor 10.

(3) The configuration in which the second case 52 includes the first holding portion 53, which holds the first extending portion 74, and the second holding portion 54, which holds the second extending portion 75, is suitable for the manufacture of the motor-driven compressor 10, in which the external connector 45 extends along the extending wall 41.

(4) In the motor-driven compressor 10, the first conductive member 61 and the second conductive member 71 are joined together. Dimensional tolerances of the first conductive member 61 and the second conductive member 71 are thus easily compensated at positions where the first conductive member 61 and the second conductive member 71 are joined together. The soldered portion of the connector lead 62 of the first conductive member 61 and the circuit board 31 is thus less likely to receive stress, which improves reliability.

(5) Since the second connecting portion 73 of the second conductive member 71 is fitted into the first connecting portion 63 of the first conductive member 61, the first conductive member 61 and the second conductive member 71 can be electrically connected to each other across the seal member 27. Accordingly, a conductive path is easily established from the power supply connector 46 to the circuit board 31 without changing the position of the seal member 27.

Modifications

The above-described embodiment may be modified as follows. The above-described embodiment and the following modifications can be combined as long as the combined modifications remain technically consistent with each other.

Figure 3:
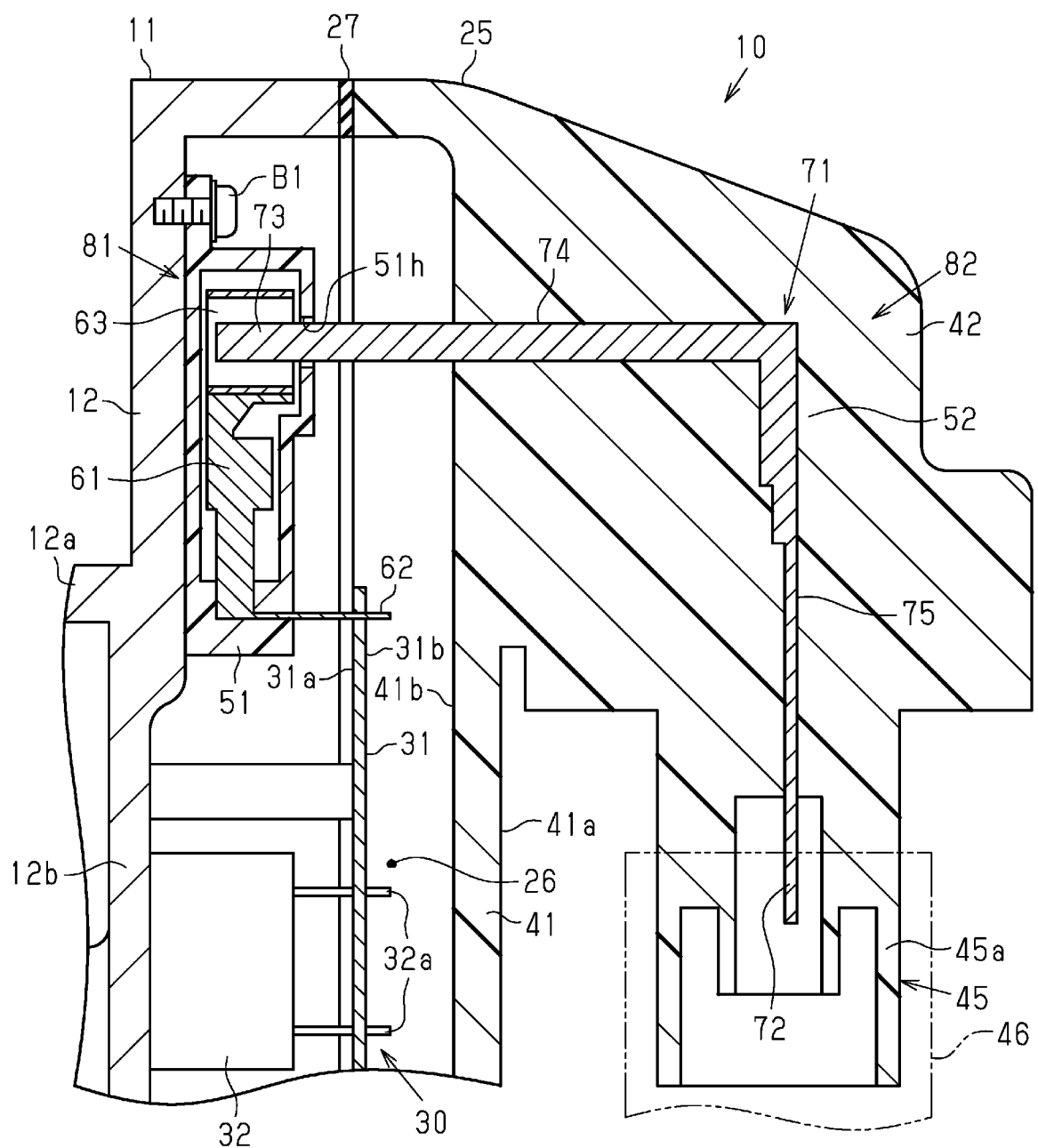
FIG. 3 is an enlarged cross-sectional view showing part of a motor-driven compressor according to another embodiment.

As shown in FIG. 3, the inverter cover 25 may be made of a plastic. The second conductive member 71 may be formed by integrating the first extending portion 74 and the second extending portion 75. In this case, the first extending portion 74 and the second extending portion 75 are configured to be a single component. In this case, the second conductive member 71 and the inverter cover 25 may be integrated through insert molding. Thus, the second case 52, which incorporates the second conductive member 71, may be integrated with the inverter cover 25. Also, the external connector 45 may be integrated with the inverter cover 25. This configuration reduces the number of components as compared to a case in which the second case 52 is a component separate from the inverter cover 25. The structure of the motor-driven compressor 10 is thus simplified.

In the above-described embodiment, the end wall 12b may be divided into two wall portions in the axial direction of the rotary shaft 15. In this case, one of the wall portions of the end wall 12b is first joined to the inverter cover 25 to define the inverter accommodating chamber 26, before being joined to the other wall portion of the end wall 12b.

In the above-described embodiment, the external connector 45 does not necessarily need to extend from the protruding wall 42 along the extending wall 41. For example, the external connector 45 may protrude from the extending wall 41 in the thickness direction of the extending wall 41. That is, any configuration may be employed as long as the inverter 30 is arranged between the electric motor 17 and the external connector 45.

In the above-described embodiment, the second case 52 may be entirely arranged inside the protruding wall 42. That is, the second case 52 may be arranged at any position as long as the second case 52 is at least partially arranged inside the protruding wall 42.

In the above-described embodiment, the first case 51 is fixed to the end wall 12b of the motor housing member 12 with a screw B1. However, the present disclosure is not limited to this. The first case 51 may be fixed to the end wall 12b of the motor housing member 12, for example, with an adhesive. That is, as long as the first case 51 is fixed to the housing 11, the fixing method is not particularly limited.

In the above-described embodiment, the first holding portion 53 is fixed to the inverter cover 25 with a screw B2. However, the present disclosure is not limited to this. The first holding portion 53 may be fixed to the inverter cover 25, for example, with an adhesive. That is, as long as the first holding portion 53 is fixed to the inverter cover 25, the fixing method is not particularly limited.

In the above-described embodiment, the second holding portion 54 is fixed to the inverter cover 25 by fitting the fitting portion 54a into the second accommodating hole 44. However, the present disclosure is not limited to this. The second holding portion 54 may be fixed to the inverter cover 25, for example, with a screw. That is, as long as the second holding portion 54 is fixed to the inverter cover 25, the fixing method is not particularly limited.

In the above-described embodiment, the motor-driven compressor 10 may be configured such that, for example, the inverter 30 is arranged to be on the outer side of the rotary shaft 15 in the radial direction in the housing 11. That is, the compression unit 16, the electric motor 17, and the inverter 30 do not necessarily need to be arranged in that order in the axial direction of the rotary shaft 15. Also, the motor-driven compressor 10 may have any structure as long as the external connector 45 protrudes from the inverter cover 25.

In the above-described embodiment, the compression unit 16 is not limited to a scroll type, but may be, for example, a piston type or a vane type.

In the above-described embodiment, the motor-driven compressor 10 is used in the vehicle air conditioner 22. However, the motor-driven compressor 10 may be used in other apparatuses. For example, the motor-driven compressor 10 may be mounted on a fuel cell electric vehicle and use the compression unit 16 to compress air, which is a fluid supplied to the fuel cell.

The term "annular" as used in this description may refer to any structure that forms a loop as a whole. "Annular"

shapes include but are not limited to a circular shape, an elliptic shape, and a polygonal shape with sharp or rounded corners. "Tubular" shapes include but are not limited to any structure having circular cross-sectional shape, an elliptic cross-sectional shape, and a polygonal cross-sectional shape with sharp or rounded corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
   a compression unit configured to compress a fluid;
   an electric motor configured to drive the compression unit;
   an inverter configured to drive the electric motor;
   a motor housing member that includes a peripheral wall and an end wall closing one end of the peripheral wall, the motor housing member accommodating the electric motor;
   an inverter cover that is joined to the end wall so as to define an inverter accommodating chamber, the inverter accommodating chamber accommodating the inverter; and
   an external connector that is fixed to the inverter cover and is configured to be connected to a power supply connector from outside, wherein
   the inverter includes a circuit board and an electrical component mounted on the circuit board,
   the electrical component is thermally coupled to the end wall,
   the inverter accommodating chamber incorporates a first internal connector and a second internal connector,
   the first internal connector includes a first case that is made of a plastic and is fixed to the end wall, and a first conductive member that is incorporated in the first case,
   the second internal connector includes a second case that is made of a plastic and is fixed to the inverter cover, and a second conductive member that is incorporated in the second case,
   the first case is located between the circuit board and the end wall of the motor housing member, and the second case is located on a side opposite to the first case with respect to the circuit board,
   the circuit board includes a first surface that faces the end wall, and a second surface that is on a side opposite to the first surface,
   a first end of the first conductive member and a lead of the electrical component extend through the circuit board from the first surface and are soldered to the circuit board on the second surface,
   a first end of the second conductive member is configured to be electrically connected to the power supply connector,
   a second end of the first conductive member and a second end of the second conductive member are configured such that, when the inverter cover is joined to the motor housing member, the second end of the first conductive member and the second end of the second conductive member are mated to each other so as to be electrically connected to each other, causing the circuit board to be electrically connected to the power supply connector through the first conductive member and the second conductive member that are mated to each other, and,
   when the inverter cover is separated from the motor housing member, the second end of the first conductive member and the second end of the second conductive member are unmated from each other so as to be electrically disconnected from each other.

2. The motor-driven compressor according to claim 1, wherein
   the inverter cover is made of a metal,
   the inverter cover includes:
   an extending wall that extends along the circuit board; and
   a protruding wall that is located on a side opposite to the circuit board and protrudes from the extending wall in a protruding direction away from the circuit board,
   the external connector is fixed to the protruding wall and extends from the protruding wall and along the extending wall, and
   the second case is at least partially arranged inside the protruding wall.

3. The motor-driven compressor according to claim 2, wherein
   the second conductive member includes:
   a first extending portion that extends in the protruding direction of the protruding wall; and
   a second extending portion that extends in an extending direction of the extending wall,
   the first extending portion includes an end that is fitted into the second end of the first conductive member,
   the second extending portion includes an end that is configured to be exposed in the external connector so as to be connected to the power supply connector, and
   the second case includes:
   a first holding portion that holds the first extending portion; and
   a second holding portion that holds the second extending portion.

4. The motor-driven compressor according to claim 3, wherein the first extending portion and the second extending portion are configured to be mated to each other or to be a single component.

5. The motor-driven compressor according to claim 1, wherein
   the inverter cover is made of a plastic, and
   the second case is integrated with the inverter cover.

6. The motor-driven compressor according to claim 1, wherein the inverter is arranged between the electric motor and the external connector.

* * * * *